United States Patent [19]

Giebel

[11] Patent Number: 4,556,235
[45] Date of Patent: Dec. 3, 1985

[54] INDEPENDENT WHEEL SUSPENSION FOR NON-STEERED WHEELS OF MOTOR VEHICLES

[75] Inventor: Frank Giebel, Bergheim-Busdorf, Fed. Rep. of Germany

[73] Assignee: Ford Motor Company, Dearborn, Mich.

[21] Appl. No.: 582,980

[22] Filed: Feb. 24, 1984

[30] Foreign Application Priority Data

Feb. 24, 1983 [DE] Fed. Rep. of Germany ....... 3306432

[51] Int. Cl.$^4$ ............................................. B60G 3/18
[52] U.S. Cl. ................... 280/690; 267/57.1 A; 267/63 R; 280/668; 280/673; 280/701
[58] Field of Search .............. 280/668, 673, 675, 690, 280/701; 267/57.1 R, 57.1 A, 63 R

[56] References Cited

U.S. PATENT DOCUMENTS

| | | | |
|---|---|---|---|
| 3,189,118 | 6/1965 | Arning | 280/701 |
| 3,687,479 | 8/1972 | Kober | 267/57.1 A |
| 4,273,356 | 6/1981 | Sakata et al. | 280/675 |
| 4,345,778 | 8/1982 | Minagawa | 280/668 |
| 4,400,008 | 8/1983 | Rumpel | 280/673 |
| 4,480,852 | 11/1984 | Rumpel | 280/673 |

Primary Examiner—Joseph F. Peters, Jr.
Assistant Examiner—Kenneth R. Rice
Attorney, Agent, or Firm—Jerome R. Drouillard; Roger L. May

[57] ABSTRACT

An independent wheel suspension for non-steered wheels of motor vehicles, in which a wheel support rigidly connected to a shock absorber is connected to the body or chassis by a transverse control arm and a longitudinal strut. The wheel support is connected to the outer bifurcated end of the transverse control arm by a pin which extends generally in the longitudinal direction of the vehicle and is mounted in resilient bushings. The wheel support is also pivotably connected to the trailing end of the longitudinal arm by resilient bushings. To compensate for changes in toe angle as a result of compression and rebound movement, the resilient bushings at opposite ends of the pin connecting the transverse control arm to the wheel support are provided with non-uniform outer sleeves and non-uniform inner sleeves arranged in a specific relationship with the front bushing mounted upside down relative to the rear bushing.

10 Claims, 6 Drawing Figures

INDEPENDENT WHEEL SUSPENSION FOR NON-STEERED WHEELS OF MOTOR VEHICLES

1. FIELD OF THE INVENTION

This invention relates to an independent wheel suspension for non-steered wheels of motor vehicles, in which a wheel support rigidly connected to a telescoping shock absorber is connected to the chassis or body by a transverse absorber is connected to the chassis or body by a wheel support being connected to the bifurcated outer end of the transverse arm by a pin which extends generally in the longitudinal direction of the vehicle and is mounted in resilient bushings and pivotally connected to the end of the longitudinal strut by means of resilient bushings.

2. DISCLOSURE INFORMATION

An independent wheel suspension of this general type is known from German Utility Model No. GM 71 26 203. Ford Motor Company Escort and Lynx vehicles manufactured in the United States have also employed this type of suspension.

In the case of an independent wheel suspension of this type, changes in toe angle occur during suspension compression and rebound. These changes may adversely affect driving performance.

An independent wheel suspension for non-steered wheels of motor vehicles is known from German Auslegeschrift No. 28 18 198, in which a suitable design of the resilient bushings which form the pivot bearings for the various arms of the wheel suspension results in the pivotal movements of the wheel being load dependent. U.S. Pat. No. 3,189,118 discloses an independent wheel suspension having a single lower arm with a bifurcated outer end for controlling toe angle during compression and rebound.

The invention seeks to provide an improved independent wheel suspension in which the toe angle changes caused by the geometry of the suspension may be controlled.

SUMMARY OF THE INVENTION

According to the present invention, there is provided an independent wheel suspension as set forth above in which the resilient bushings disposed in the transverse arm each comprise a non-uniform outer sleeve and a non-uniform inner sleeve arranged in a specific relationship thereto. The bushings are carried at the opposite ends of the transverse arm in the direction of travel and are inverted through 180° relative each other in such a manner that during inward and outward springing movements, i.e., compression and rebound, the change in the toe angle caused by the longitudinal strut is compensated by a lateral displacement caused by the rotation of the outer bushing sleeves relative to the inner sleeves.

Preferably, the outer sleeve has an internal surface which has n concave troughs and the inner sleeve has an outer surface which has n−1 convex lobes projecting therefrom, a resilient material being disposed in the space between the two sleeves and the outer and inner sleeves being arranged in such a manner that, in the untwisted state, on one side of the bushing the lobes are opposite corresponding troughs in a complementary manner, whereas on the diametrically opposite side the lobes are interposed between two adjacent troughs, whereby if the outer sleeve is turned relative to the inner sleeve a lateral movement of the inner sleeve takes place.

The resilient bushings are preferably provided with corresponding impressed portions on their outer sleeves which permit their mounting with correct orientation in the openings of the bifurcated end of the transverse control arm. As previously noted, the inner sleeves are provided on one side with one raised portion and on the other side with two raised portions which ensure that during turning of the inner sleeves relative to the outer sleeves the axes of the inner sleeves move radially or laterally by a predetermined amount.

BRIEF DESCRIPTION OF THE DRAWINGS

FIG. 6 is a section through a further embodiment of a resilient bushing.

DETAILED DESCRIPTION OF THE PREFERRED EMBODIMENT

Figure 1:
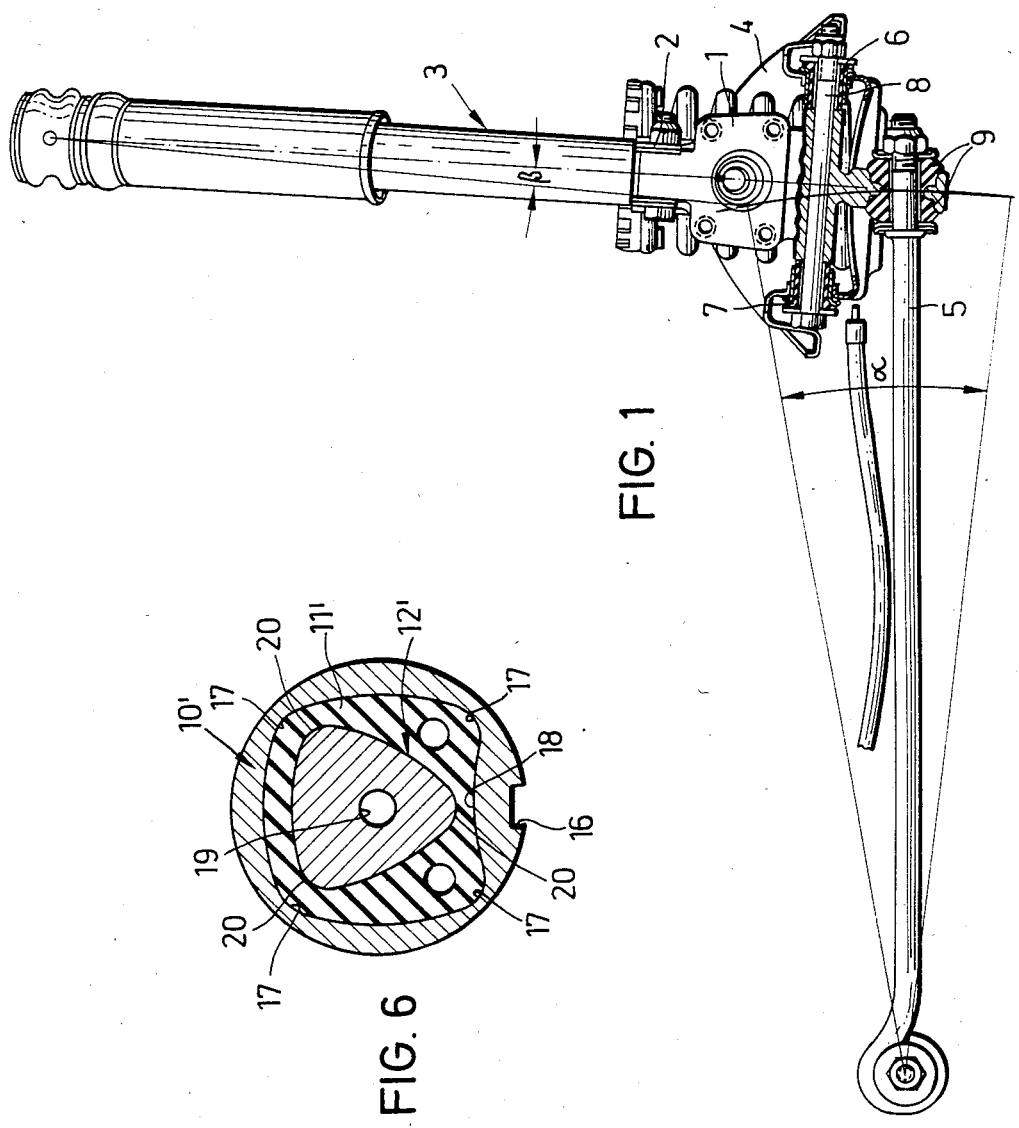
FIG. 1 is a side elevation of an independent wheel suspension according to the invention.
Figure 2:
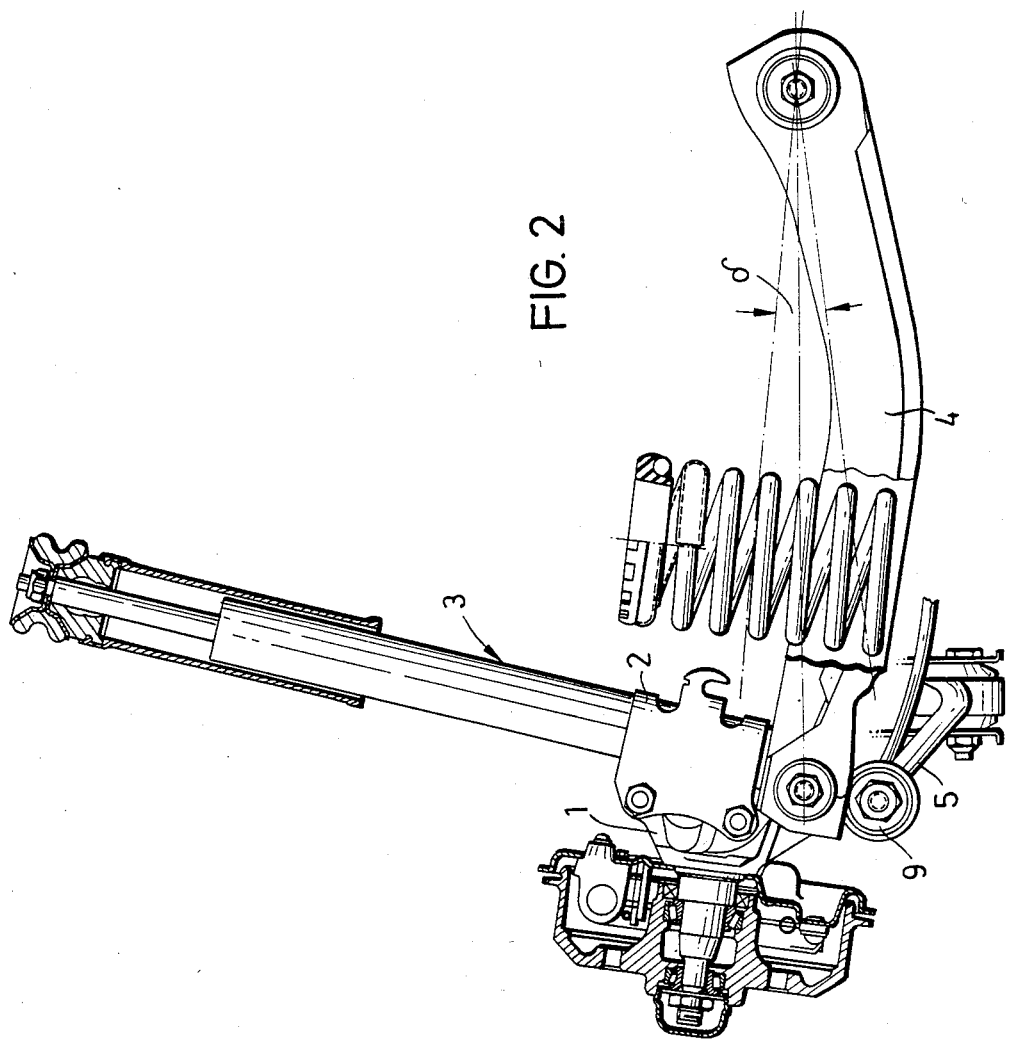
FIG. 2 is a rear elevation of the independent wheel suspension according to FIG. 1.

The independent wheel suspension illustrated in FIGS. 1 and 2 for a non-steered wheel of a motor vehicle essentially comprises a wheel support 1 which is rigidly connected to a telescoping shock absorber 3 by means of a clamping connection 2. The shock absorber is pivotally attached to the chassis at its upper end. The wheel support 1 is connected to the chassis by a transverse arm 4 and a longitudinal strut 5. The inboard end of the transverse arm and the leading end of the longitudinal strut are pivotally connected to the chassis or body in conventional manner by means of resilient bushings. A spring is provided between the transverse control arm and the chassis.

Figure 3:
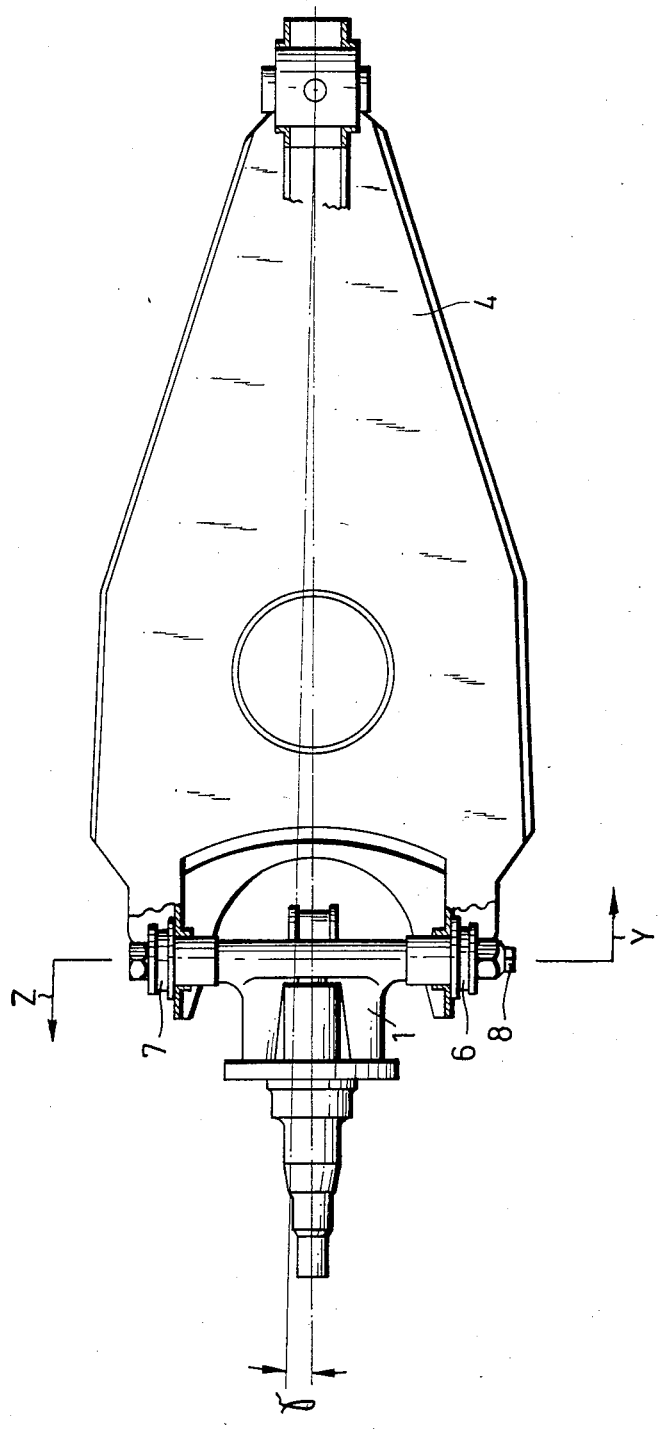
FIG. 3 is a plan view of the wheel support and the transverse arm of the independent wheel suspension according to FIG. 1.

As shown in FIG. 3, wheel support 1 is connected to the outboard bifurcated end of the transverse arm 4 by pin 8 which extends generally longitudinally of the vehicle and is mounted in resilient bushings 7 and 6, which are received in the leading and trailing sections, respectively, of the transverse arm 4. If desired, two separate bolts or pins could be employed instead of the single pin 8. Wheel support 1 is pivotally connected to the trailing rod-shaped end of the longitudinal strut 5 by means of resilient bushings 9.

If the independent wheel suspension described herein moves from the condition of compression to the rebound condition, the longitudinal strut 5 will move through the angle α designated in FIG. 1 and at the same time the axis of the telescoping shock absorber 3 will be deflected through the angle β. Similarly, transverse arm 4 will be pivoted through the angle δ (FIG. 2). The deflection of the transverse arm 4 through the angle γ results in an unwanted change (FIG. 3) in the toe angle which ideally should be independent of the suspension's vertical position. During travel in a straight line over an undulating uneven surface, the change in toe angle causes undesired roll steer characteristics of the independent wheel suspension. Operation of the bushings 6 and 7 to minimize the this change in toe angle will now be described.

Figure 4:
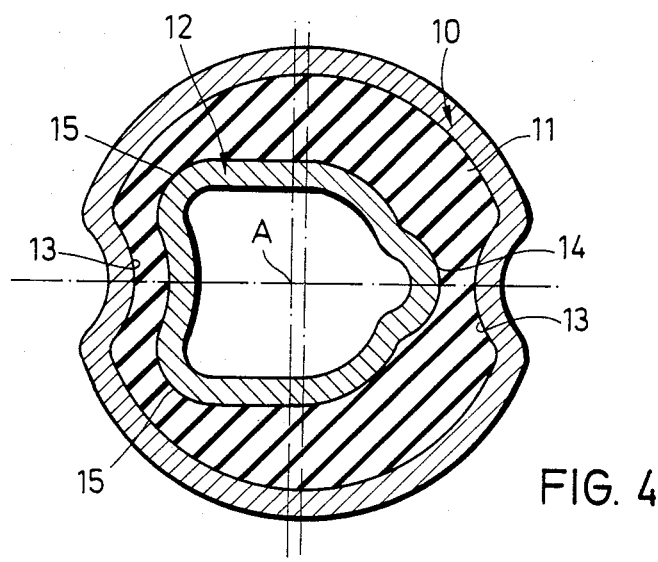
FIG. 4 is a section through a resilient bushing of the invention in the untwisted position.
Figure 5:
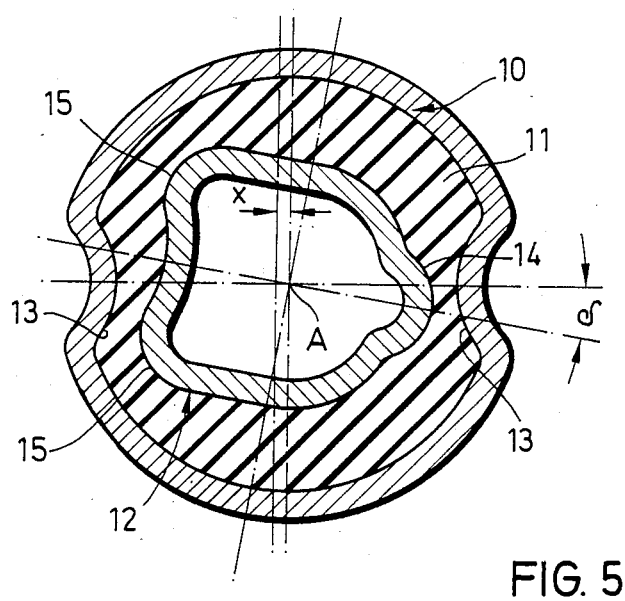
FIG. 5 is a section through the resilient bushing of FIG. 4 after pivoting through a specific twisting angle.

The resilient bushings 6 and 7, as illustrated in FIGS. 4 and 5, comprise a non-uniform outer sleeve 10, a non-uniform inner sleeve 12 and a resilient material 11 arranged in the space between the two sleeves 10 and 12.

The sleeve 10 is formed with two inwardly directed convex lobes 13 which are diametrically opposite one another. A first lobe 13 is arranged directly opposite a first convex lobe 14 projecting from one side of the inner sleeve 12 while the second convex lobe 13 is arranged symmetrically between two additional convex lobes 15 projecting from the other side of the inner sleeve 12.

If, as shown in FIG. 5, the outer sleeve 10 is turned through an angle of δ with respect to the inner sleeve 12, the lobes 13, 14 and 15 cooperate with one another in such a way that the axis A of the inner sleeve 12 is displaced laterally by an amount X.

Because of the pivoting of the transverse arm 4 about a substantially longitudinal axis during compression and rebound, the outer sleeves 10 of the bushings 6 and 7 secured in the transverse arm 4 must be turned with respect to their inner sleeves secured on the pin 8 and the wheel support 1.

Looking now at FIG. 3 in which the change in the angle of toe-in caused by articulation of the longitudinal arm 5 is designated δ, it may be clearly seen that when the resilient bushings 6 and 7 are constructed in the manner shown in FIGS. 4 and 5 and are arranged in such a manner that the rear resilient bushing 6 shifts its inner sleeve in the direction toward the interior of the vehicle (arrow Y) and the front resilient bushing shifts its inner sleeve toward the exterior of the vehicle (arrow Z), the change in toe angle of the wheel support as a consequence of the suspension geometry and the compression and rebound movement may be controlled. Thus, the resilient bushings 6 and 7 comprise not only means for connecting the transverse control arm to the wheel support but also means for rotating the wheel support relative to the transverse control arm about substantially vertical axes during compression and rebound movement of the wheel support. In this manner, the toe angle of the wheel support is controlled.

A further embodiment is shown in FIG. 6, in which an outer sleeve 10' is connected to an inner sleeve 12' by means of a resilient material 11'. In this case, the outer sleeve 10' has a circular external profile with a groove 16 to prevent turning the control arm and to fix its position. The inner profile comprises four concave troughs 17 and one convex lobe 18. The inner sleeve 12' on the other hand is provided with a receiving bore 19 for a pin and comprises an external profile with three convex lobes 20.

The arrangement of the inner sleeve 12' within the outer sleeve 10' is selected to be such that, in the untwisted state, on one side the lobes 20 of the inner sleeve 12' are opposite corresponding troughs 17 of the outer sleeve 10' in a complementary manner whereas on the opposite side the convex lobe 20 is interposed between two adjacent troughs 17 or is opposite a convex lobe 18.

Variations and modifications of the present invention resulting in the lateral displacement of the two sleeves toward one another as a function of a pivoting of the outer sleeve relative to the inner sleeve, are possible without departing from the spirit and scope of the invention as defined by the appended claims.

The embodiments in which an exclusive property right or privileges is claimed are defined as follows: I claim:

1. An independent wheel suspension for non-steered wheels of motor vehicles comprising:
   a wheel support;
   a transverse control arm pivotally attached at its inboard end to the chassis and at its outboard end to said wheel support; and
   means for connecting said transverse control arm to said wheel support and for rotating said wheel support relative to said transverse control arm about substantially vertical axes during compression and rebound movement of said wheel support whereby the toe angle of said wheel support will be controlled.

2. The suspension of claim 1 further comprising a telescopic shock absorber rigidly attached at its lower end to said wheel support and pivotally attached to its chassis at its upper end.

3. The suspension of claim 1 further comprising a longitudinal strut pivotally attached to the chassis at its leading end and pivotally attached to said wheel support at its trailing end.

4. The suspension of claim 1 further comprising a spring disposed between said transverse control arm and the chassis.

5. The suspension of claim 1 wherein said transverse control arm has a bifurcated outer end and said means for connecting said transverse control arm to said wheel support and for rotating said wheel support relative to said transverse control arm comprises resilient bushings located in said bifurcated outer end of said transverse control arm.

6. The suspension of claim 5 wherein said resilient bushings are retained in said transverse control arm by a pin which extends generally in the longitudinal direction of the vehicle.

7. The suspension of claim 5 wherein said resilient bushings comprise:
   an outer sleeve having n concave troughs formed in its inner surface;
   an inner sleeve having n−1 convex lobes projecting from its outer surface; and
   a resilient material disposed in the generally annular space between the inner and outer sleeves;
   said inner sleeve being oriented with respect to said outer sleeve such that said inner sleeve will be displaced radially relative to said outer sleeve when said inner sleeve is rotated relative to said outer sleeve.

8. The suspension of claim 5 wherein said resilient bushings control the toe angle of said wheel support during compression and rebound movement by laterally displacing the front portion of the wheel support in a direction away from the interior of the vehicle while at the same time laterally displacing the rear portion of the wheel support in a direction toward the interior of the vehicle.

9. The suspension of claim 5 wherein said resilient bushings comprise:
   an outer sleeve having a circular external surface with a locating notch and an internal surface with n concave troughs and one convex lobe;
   an inner sleeve with n−1 convex lobes; and a resilient material disposed between said inner and outer sleeves.

10. An independent suspension for non-steered wheels of motor vehicles comprising:
   a wheel support;
   a transverse control arm pivotally attached to its inboard end to the chassis and having a bifurcated outer end;
   a telescopic shock absorber attached at its lower end to said wheel support and at its upper end to said chassis;
   a longitudinal strut pivotally attached at its leading end to said chassis and resiliently attached at its trailing end to said wheel support;
   a spring member interposed between said transverse control arm and said chassis;
   resilient bushings connecting said transverse control arm and said wheel support, said bushings comprising:
   an outer sleeve;
   an inner sleeve;
   resilient material disposed in the space between the inner and outer sleeves; and
   means for radially shifting the inner sleeve of said resilient bushing relative to said outer sleeve of said resilient bushing whereby said wheel support will be urged in the direction of toe out during compression and rebound movement.

* * * * *